J. W. REED.
Lubricator.
No. 168,671.
Patented Oct. 11, 1875.
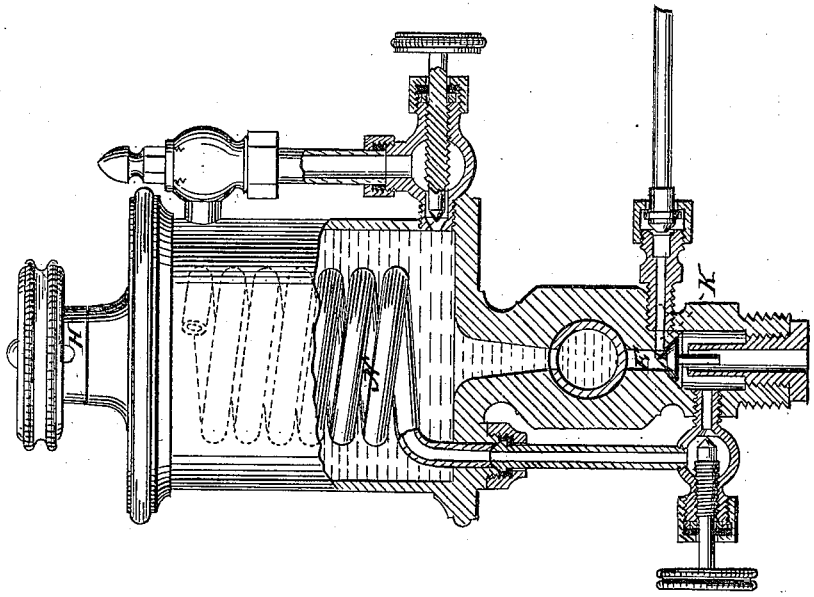
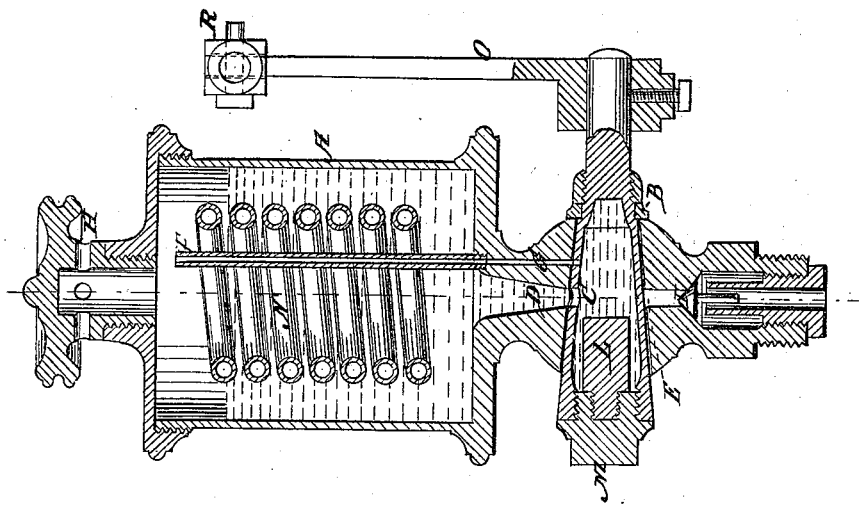
WITNESSES:
E. Wolff
A. F. Terry
INVENTOR:
J. W. Reed
BY
Munn & Co.
ATTORNEYS.

UNITED STATES PATENT OFFICE.

JOSEPH WARREN REED, OF KALAMAZOO, MICHIGAN.

IMPROVEMENT IN LUBRICATORS.

Specification forming part of Letters Patent No. 168,671, dated October 11, 1875; application filed September 4, 1875.

*To all whom it may concern:*

Be it known that I, JOSEPH W. REED, of Kalamazoo, in the county of Kalamazoo and State of Michigan, have invented a new and useful Improvement in Lubricators, of which the following is a specification:

My invention relates to the lubricators for steam-engines in which a hollow plug is charged from the holder and discharged into the engine, at the same time cutting off the supply from the holder; and it consists, in the first place, of an improved contrivance of venting the hollow plug by which there is no waste; second, of a valve to shut off steam from the holder to prevent the mixing of water with the oil by the condensation of steam; third, of a vent or waste-pipe connecting with the space above the valve, to carry off the condensed steam in case the valve is not perfectly tight, and insure its closing; and, fourth, of a contrivance to regulate the amount of oil delivered.

Figure 1 is partly a side elevation and partly a sectional elevation of the lubricator, the section being taken on line $xx$ of Fig. 2. Fig. 2 is a sectional elevation taken in a plane at right angles to the section, Fig. 1.

Similar letters of reference indicate corresponding parts.

A is the reservoir or oil-holder, below which is the hollow plug B, which fills with oil when its opening C is turned up to coincide with the passage D, and discharges when said opening is turned down to the passage E. To vent the hollow plug when filling and discharging, I now propose to connect a pipe, F, with the air-passage G, the said pipe extending up inside of the reservoir to the top or near it, and make air-passages H in the cap so that the air will flow in and out readily. The hollow plug connects with this pipe both when filling and discharging, and the air flows in and out without any waste of oil. Below passage E is a valve, I, which is to be closed by steam when the engine is running, so that the reservoir will not be filled with condensed steam, and in order to insure the closing of this valve at all times when steam is let on, a vent-passage, K, is arranged above it. When the steam is shut off and the engine stopped the valve will fall and allow the oil to flow, and when the engine is started the steam will force up the valve and close it. L is a detachable plug screwed into the end of plug M, which closes the hollow plug B, for partly filling the space when the quantity to be discharged into the cylinder is not equal to the whole capacity of the space. Interchangeable plugs of different sizes will be employed to vary the amount at will. N is a coil for allowing a circulation of steam in the oil for heating it in cold weather in case of need. It is provided with a cock for shutting it off. O is a lever for turning the plug B in a locomotive engine. It will have a rod, R, extending to the cab, by which the engineer can work it therefrom.

Having thus described my invention, I claim as new and desire to secure by Letters Patent—

1. The combination, with bottom plug in lower part of oil-holder, of the pipe F and air-passages in cap, all arranged as set forth.

2. The valve I, combined with hollow plug of an oil-holder, having vent-passage K, as and for the purpose described.

3. The combination of plugs L M, with hollow plug B, as and for the purpose specified.

JOSEPH WARREN REED.

Witnesses:
E. W. DEYOE,
WILLIAM KEAVY.